June 29, 1948.  R. C. SANDERS, JR  2,444,171
AIRCRAFT NAVIGATION
Filed July 26, 1944　　　　　　　　　　　　　2 Sheets-Sheet 1
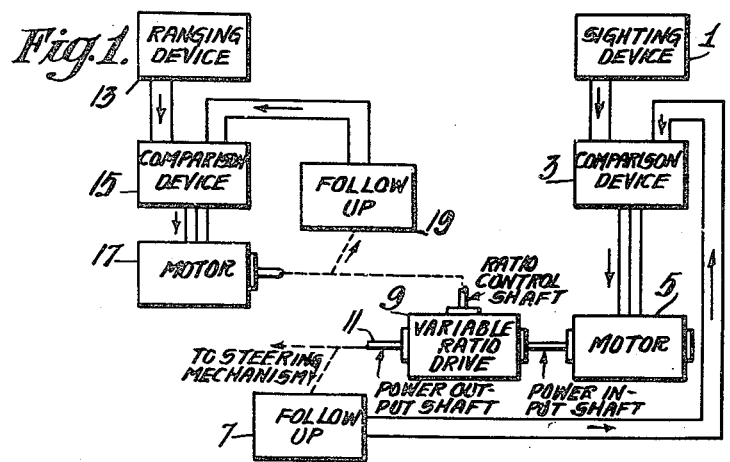
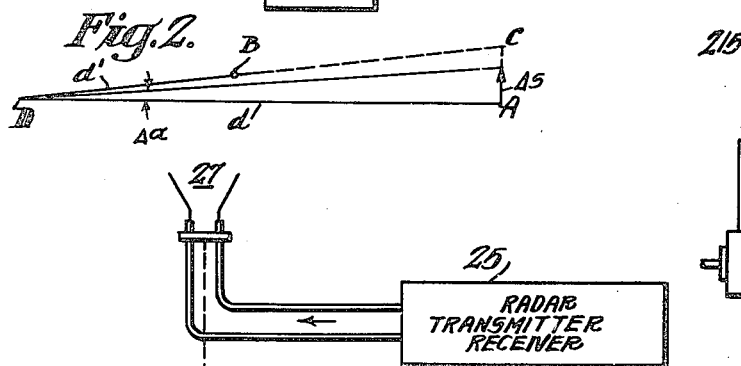
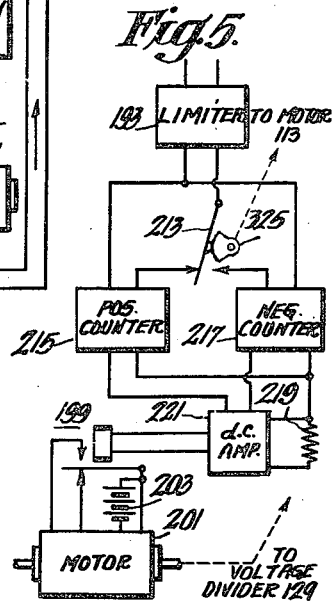
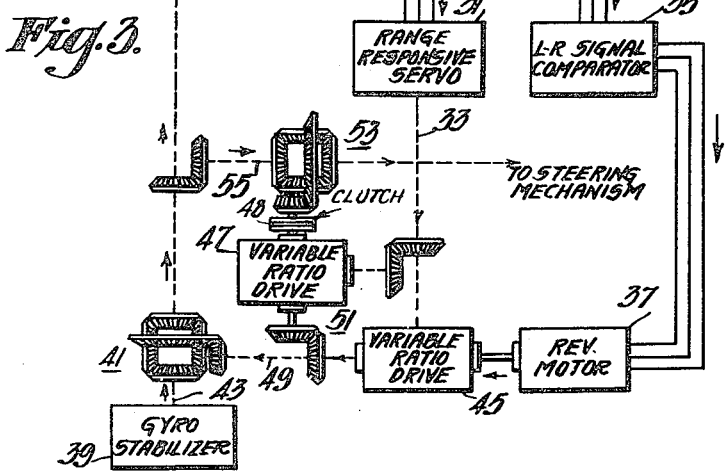
INVENTOR.
Royden C. Sanders, Jr.
BY
ATTORNEY

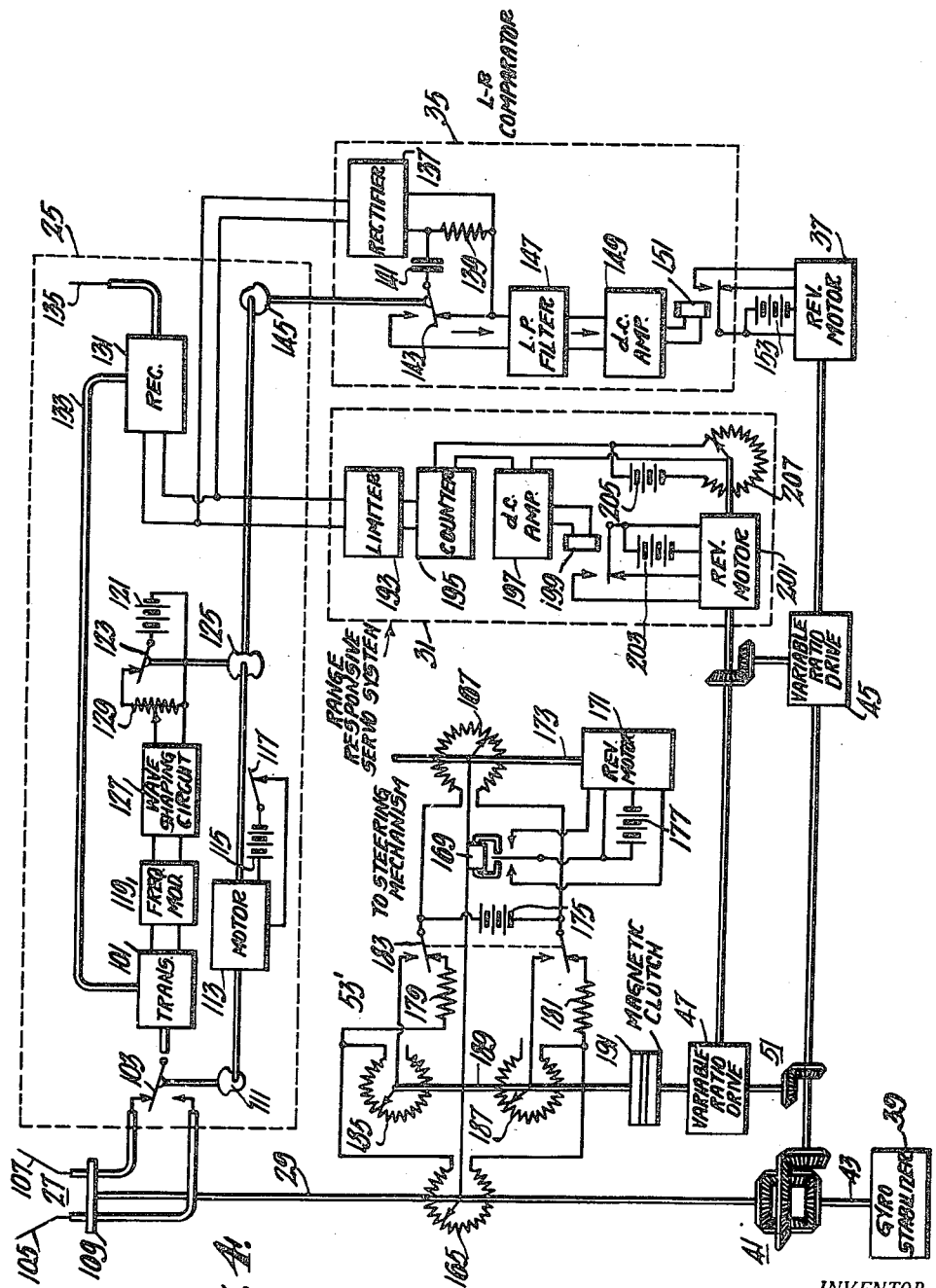

Patented June 29, 1948

2,444,171

UNITED STATES PATENT OFFICE 2,444,171

AIRCRAFT NAVIGATION

Royden C. Sanders, Jr., Hightstown, N. J., assignor to Radio Corporation of America, a corporation of Delaware Application July 26, 1944, Serial No. 546,608

9 Claims. (Cl. 343—7)

This invention relates to aircraft navigation and more particularly to improvements in the art of directing automatically an aircraft or other mobile craft to intercept a selected moving target or other objective.

It is well known in prior art practice to direct the travel of a mobile craft by means of a sighting device or radio direction finder which is maintained in alignment with the objective. The term "line of sight" as used herein is intended to mean the line between the objective, or target, and the controlled craft, or "seeker" as determined in any manner, including radio direction finding. The present invention is particularly applicable to systems in which the line of sight is determined by directive radio means.

The principal object of the present invention is to provide methods of and means for obtaining smoother and more reliable operation of automatic target-seeking systems of the type described. Specifically, it is proposed to provide a method of and means for controlling automatically the speed of response of the seeker steering means as a predetermined function of the distance of the seeker from the target. Another object is to provide a method of and means for effecting such control as a function of the rate of change of said distance, as well as a function of the distance.

The invention will be described with reference to the accompanying drawings of which Figure 1 is a schematic block diagram of a target azimuth responsive steering system embodying the present invention, Figure 2 is a geometrical diagram illustrating the operation of the invention, Figure 3 is a schematic block diagram of a modification of the system of Figure 1, Figure 4 is a more detailed diagram of the system of Figure 3, including certain minor modifications, and Figure 5 is a schematic diagram of an alternative form of range responsive servomotor system which may be employed in the system of Figure 4.

Refer to Figure 1. A target sighting device 1 is coupled to the steering mechanism (not shown) of the seeker craft through a servomotor system, which comprises a comparison device 3, a motor 5, and a follow-up device 7. A servomotor system is defined as means for driving a mechanical load device to a position corresponding in a predetermined manner to some characteristic of an input signal, including a motor coupled to the load device, and means responsive to difference between the actual position of the load device and the position corresponding to the existing input signal, to control the motor so as to drive the load device to the position corresponding to the input signal. As the load device reaches the correct position, the motor is deenergized until a further variation of the input signal takes place. The input signal may be in the form of mechanical displacement of a control device, variation in magnitude of an electrical signal, or in fact any variation of a detectable quantity.

In the system of Figure 1, it is assumed that the sighting device 1 provides an electrical output having a magnitude which is proportional to the azimuth of the target, referred to a predetermined line such as the fore and aft line of the craft carrying the device. This output is applied to a signal comparison device 3. A motor 5 is connected to the device 3 and is mechanically coupled through variable ratio drive means 9 to the steering mechanism of the seeker craft. A follow-up device 7 is also coupled to the output shaft 11 of the variable ratio drive, and is connected to the signal comparison device 3. In operation, the comparison device 3 responds to the difference between the outputs of the sighting device 1 and the follow-up device 7 to control the energization of the motor 5 so as to drive the shaft 11 to an angular position corresponding to the target azimuth as determined by the sighting device.

A ranging device 13, which may be part of a composite system including the sighting device 1, is coupled through a servomotor system comprising a comparison device 15, motor 17, and a second follow-up device 19, to the control input shaft 21 of the variable ratio drive 9. The devices 15, 17, and 19 are interconnected similarly to the above-described devices 3, 5 and 7, and operate in the same manner to position the shaft 21 in accordance with the target range, in response to electrical output from the ranging device 13.

The operation of the above-described system is as follows:

A selected target is followed by the sighting device 1, providing input to the comparison device 3. As long as the output shaft 11, and hence the steering mechanism and the first follow-up device 7, is in an angular position corresponding to target azimuth, the motor 5 is not energized. Upon the occurrence of a difference in the position of the shaft 11 from that corresponding to the target azimuth, the motor 5 runs to drive the shaft to the correct position, at the same time displacing the steering mechanism and the foldevice 7 by a corresponding amount.
e seeker craft is continuously steered di-
)ward the target, its course being cor-
utomatically as the need arises, in re-
o the sighting device 1.
be apparent that, as in any control sys-
re must be some deviation of the con-
raft from its proper course before a
n can be applied. In order for the com-
levice 3 to energize the motor 5, the shaft
deviate from the position corresponding
arget azimuth. The rate at which the
n is made depends upon the sensitivty
mparison device, and the running speed
otor 5. It also depends upon the ad-
; of the variable ratio drive means 9.
sighting devices, particularly those of
which radiate a signal which is reflected
the sighting equipment by the target,
ect to troublesome limitation in their
 distinguish one of a plurality of targets
adjacent lines of sight. A target seeker,
ing a selected objective under the con-
radio sighting device, may get in a posi-
 that another, unsought reflecting object
line near the line of sight to the selected
If the reflection from the unsought
large, the seeker is likely to switch over
ing the desired target as the lines of
arate again.
f the desired target may occur also as
)f a momentary "glint" or strong reflec-
 some object off the line of sight. The
ll automatically turn toward the strong
When this signal disappears, or lapses
nal magnitude, the sighting device is so
e selected target that it settles on a new
oser to the new line of sight.
ing to the present invention, the afore-
d difficulties are minimized by control-
rate at which correction of the line of
nade. The rate of change of the sight $$\frac{da}{dt} = \frac{1}{d}\frac{ds}{dt}$$

$$\frac{ds}{dt}$$

rift velocity (velocity component per-
r to the line of sight of the target with
 the seeker), and $d$ is the distance of the
m the target. It is proposed herein to
e rate of sight angle correction to a
proximating the maximum rate of
f sight angle that can occur with the
r target being sought. This is accom-
the system of Figure 1 by controlling the
sponse of the azimuth responsive servo-
tem as an inverse function of the target nection of the motor 17 to the variable
9 is such that as the distance decreases,
of the shaft 11 with respect to that of
 5 increases proportionately. The ex-
ich the drive ratio changes in response
 change in distance is predetermined
lance with the maximum transverse $$\frac{ds}{dt}$$

untered in the operation of the system.
ng to Figure 2, assume that a seeker craft at the point D is homing, under the control of a system like that of Figure 1, on a target at A, which is travelling substantially transversely to the line of sight D—A with a velocity $v$ represented by the arrow at A. In a unit of time $\Delta t$, the target moves a distance $\Delta s$. The average rate of change of the sight angle is $$\frac{1}{d}\frac{\Delta s}{\Delta t}, \text{ or } \frac{\Delta a}{\Delta t}$$

A second target is at the point B, a distance $d'$ from the seeker. The line D—B is at a relatively small angle to the line of sight D—A. If the signal from the target at A falls momentarily, or the influence of the target at B becomes stronger than that of the target at A for any reason, the seeker will automatically start to turn toward B. If there were no restriction on the rate of turn of the seeker, the steering system would operate at the maximum speed of which it is capable, completing the turn toward B in a relatively short time. Thus the target at A would be lost, and the target at B substituted. However, the variable ratio drive 9 is adjusted automatically in response to the ranging device 13, as described above, so that the maximum rate of turn which can be effected by the seeker is $$\frac{1}{d}\frac{\Delta s}{\Delta t}$$

A "glint" from the target at B will impress the sighting device as a sudden jump of the selected target from A to C, corresponding to a much higher velocity $$\frac{ds}{dt}$$

than is recognized by the equipment as possible. The apparent jump is ignored, and after the undesired reflection subsides, the selected target is picked up again with a very slight readjustment of the line of sight. The speed of operation of the servomotor 17 in altering the drive ratio is made quite low, in order to prevent false adjustment of the drive ratio by the ranging device 13 in response to a strong off-side reflection.

The invention has been described thus far with reference to a homing system, wherein the seeker is continuously steered directly toward the target. Any relative motion transverse to the line of sight between the seeker and the target results in curvature of the homing course. Such transverse motion is called drift. A linear, drift-corrected course may be obtained by steering the seeker at an angle to the line of sight such that the drift is compensated by an equal transverse component of seeker motion. This is usually accomplished by steering the seeker in response to the sighting means so that as the line of sight changes through some angle $\Delta a$, the direction of travel of the seeker is altered by an amount $n\Delta a$, where $n$ is greater than 1. The factor $n$ is known as the navigation ratio.

Under constant drift conditions, a series of such corrections will place the seeker on a linear interception course. Change in the drift will necessitate repetition of the procedure to set up a new drift-corrected course. The magnitude of the navigation ratio determines the rapidity with which a drift-corrected course is established. Owing to various practical considerations, the value of $n$ is ordinarily limited within the range of 1.5 to 6, depending upon the characteristics of the particular system. The optimum value is determined by several factors, including the distance of the seeker from the target, the rate of approach of the seeker to the target, and the rapidity of response of the steering means to a change Δa in the line of sight. Copending U. S. applications Ser. No. 537,020 now Patent No. 2,420,016 issued May 6, 1947, and Ser. No. 537,-021 now Patent No. 2,420,017 issued May 6, 1947, relate to systems for controlling automatically the magnitude of the ratio $n$ as functions of the target distance and the time from target, respectively.

The present invention can be applied with particular advantage to such systems, since a false correction in sight angle will introduce a corresponding false drift correction, making loss of the target more probable than if a simple homing course were involved. Moreover, the target range responsive means for control of the navigation ratio may also be used for the control of sight angle correction speed, with little additional equipment.

Refer to Figure 3. A radar transmitter-receiver system 25 is provided with a directive antenna array 27, arranged for rotation about a vertical axis by means of a shaft 29. A target range responsive servomotor system 31 is connected electrically to the device 25, to maintain its output shaft 33 in an angular position corresponding to the target distance. A signal comparator device 35, which may be of the type described in copending U. S. application Ser. No. 534,114 filed on May 4, 1944 by W. R. Mercer, now Patent No. 2,433,287, issued December 23, 1947, is also connected to the radar system 25. The signal comparator 35 is connected to a reversible motor 37 to energize it for running in one direction or the other in accordance with the deviation of a target from the center line of the directive pattern of the antenna 27.

A gyro stabilizer device 39 of any suitable design is coupled through a differential mechanism 41 to the shaft 29. The stabilizer 29 maintains its shaft 43 in a constant angular position in space. The reversible motor 37 is coupled through a variable ratio drive mechanism 45 to the differential 41. Rotation of the motor 37 rotates the shaft 29 with respect to the shaft 43, at a speed depending upon the adjustment of the variable ratio drive 45. The shaft 33 of the servomotor system 31 is coupled to the control shaft of the variable ratio drive 45 to control the rate of line of sight correction, as in the system of Figure 1.

The shaft 33 is also coupled to the control input shaft of a second variable ratio drive mechanism 47. The power input shaft of the variable ratio drive 47 is coupled to the sight angle correction shaft 49 by means of gears 51. The power output shaft of the variable ratio drive 47 is coupled to a differential 53. The shaft 29 is coupled through a shaft 55 and the differential 53 to the steering mechanism, not shown. A clutch 48 is provided in the connection between the drive 47 and the differential 53.

In the operation of the above-described system, the antenna 27 is continuously maintained in alignment with the target. Any departure of the line of sight to the target from the directive axis of the antenna 27 causes the motor 37 to drive the antenna through the variable ratio drive 45 and the differential 41, to a position corresponding to the line of sight. Rotation of the antenna shaft 29 rotates also the shaft 55. The motion of the shaft 55 is added, in the differential 53, to that of the output of the variable ratio drive 47. Thus the steering mechanism is rotated through an angle $$(1+m)a$$

where $m$ is the drive ratio of the mechanism 47. The connection of the shaft 33 to the drive 47 is such as to decrease the ratio $m$ with decrease of target range. As described in connection with Figure 1, the connection of the shaft 33 to the drive 45 is such as to increase the ratio with decrease of target range. Thus, when the seeker is at a relatively great distance from the target, the rate of correction of the sight angle is relatively low, but a small change in sight angle causes a relatively large change in the position of the steering mechanism. As the target is approached, the above conditions are gradually reversed; the rate of sight angle correction increases, corresponding to the larger angular target velocity which is possible, and the navigation ratio is decreased to minimize "fish tailing," or variation of the seeker course in response to momentary variations of apparent sight angle. Homing operation, as in the system of Figure 1, may be obtained by disengaging the clutch 48.

The radar system 25 may be of the F.-M. type described in the aforementioned copending U. S. applications Ser. No. 537,020 now Patent No. 2,420,016, issued May 6, 1947 and Ser. No. 537,021 now Patent No. 2,420,017 issued May 6, 1947 and illustrated herein in Figure 4. The range responsive servomotor system 31 may be of the type described in U. S. Patent No. 2,420,016, or may be of the type providing mechanical output as a function of time from target, as shown in U. S. Patent No. 2,420,017 and described in more detail and claimed in copending U. S. application Ser. No. 534,109 filed on May 4, 1944 by R. C. Sanders, Jr., now Patent No. 2,419,046 issued April 15, 1947.

Refer to Figure 4. Similar numerals are used in Figures 3 and 4 to refer to similar parts. The radar system 25 includes a radio transmitter 101, coupled through a double-throw switch 103 to the array 27, which comprises a pair of directive antennas 105 and 107. The antennas 105 and 107 are positioned on a supporting member 109 in such manner that their radiation patterns overlap, intersecting in an equi-signal line. The switch 103 is arranged to be cyclically actuated from one position to the other by means of a cam 111, driven by a motor 113. The motor 113 is energized by a battery 115, through a switch 117. Thus, as the motor 113 rotates, energy is radiated by the antennas 105 and 107 alternately in overlapping lobes. A frequency modulator 119 is connected to the transmitter 101 to vary cyclically the frequency of operation thereof. The modulator 119 may be of the vibratory variable capacitor type, such as that described in copending U. S. application Ser. No. 471,003, filed by S. V. Perry on January 1, 1943 and entitled "Capacity modulator unit." The modulator 119 is preferably energied to provide substantially triangular wave variation of frequency of the transmitter 101. This may be accomplished by means of a square wave generator comprising a battery 121 and a switch 123 which is cyclically actuated by means of a cam 125 driven by the motor 113. The square wave voltage is applied to the modulator 119 through a wave shaping circuit 127 which may be an integrating circuit, or may comprise an arrangement of the type disclosed in copending U. S. application Ser. No. 512,153 filed by Irving Wolff on November 29, 1943 and entitled "Vibratory mechanical systems." An adjustable voltage divider 129 is included in the input circuit of the wave shaping circuit 127 to control the range of the variation in frequency of the transmitter 101.

A receiver 131 is coupled to the transmitter 101 by means of a transmission line 133. The receiver 131 is also provided with an antenna 135 which may be non-directive, but preferably has an axis of maximum response parallel to the fore and aft line of the craft upon which the equipment is mounted. The receiver 131 may comprise a detector and an audio frequency amplifier but preferably includes a balanced detector of the type described in U. S. application Ser. No. 445,010 filed by R. C. Sanders, Jr. and I. Wolff on May 29, 1942 and entitled "Frequency modulated radio altimeters" now Patent No. 2,419,046 issued April 15, 1947. The output of the receiver 131 is applied to the comparator 35.

The comparator 35 includes a rectifier 137 which is provided with a load resistor 139. The upper end of the resistor 139 is connected through a capacitor 141 to a double-throw switch 143, which is arranged to be actuated in synchronism with the switch 103, by means of a cam 145 driven by the motor 113. The fixed contacts of the switch 143 are connected respectively to a low pass filter 147 and to the lower end of the load resistor 139, so that as the switch 143 operates, the capacitor 141 is alternately connected across the resistor 139 and in series therewith to the filter 147. This arrangement is described in detail and claimed in copending U. S. application Ser. No. 534,114 filed by William R. Mercer on May 4, 1944 and entitled "Comparator circuit."

The output of the filter 147 is applied to a D.-C. amplifier 149 which is connected to a relay 151. The amplifier 149 and the relay 151 are adjusted so that when the input to the amplifier 149 is of one polarity, the armature of the relay 151 is "picked up." When the polarity of the amplifier input is of the opposite polarity, the armature of the relay is released. Preferably the relay 151 is arranged to have a small "dead space" so that it is operated to neither of its positions unless the input to the amplifier 149 exceeds a predetermined minimum magnitude.

The contacts of the relay 151 are connected between a battery 153 and the reversible motor 37. The shaft of the motor 37 is mechanically coupled, as in the system of Figure 3, through the variable ratio drive 45 and differential gearing 41 to the shaft 29. The shaft 29 is connected to the member 109 which supports the antennas 105 and 107. The gyro stabilizer 39 is also connected to the differential 41, as in the system of Figure 3.

The system as thus far described operates in a manner substantially identical to that described in the aforementioned Mercer application. Owing to cyclical operation of the switch 103, energy is radiated alternately by the antennas 105 and 107 in overlapping lobes. A target lying within range of the equipment will reflect some of the radiated energy back to the antenna 135. If the target lies in the equi-signal line, the input to the receiver 131 from the antenna 135 will remain constant as the switch 103 operates. However, if the target lies to one side of the equi-signal line, for example to the right, the signal arriving at the antenna 135 will be stronger when the switch 103 is in its upper position and weaker when the switch 103 is in its lower position.

The signal picked up by the antenna 135 is combined in the receiver 131 with energy conducted from the transmitter 101 through the line 133. The output of the receiver 131 will include a beat signal corresponding in average frequency to the distance of the target, as in the conventional F.-M. altimeter. This beat signal is rectified by the rectifier 137 to provide a D.-C. voltage across the load resistor 139, proportional in magnitude to the amplitude of the beat signal, which in turn is proportional to the strength of the reflected signal picked up by the antenna 135. Thus, unless the target lies within the equi-signal line of the antennas 105 and 107, the D.-C. voltage across the resistor 139 will change cyclically between two values, synchronously with the operation of the switch 103.

Assuming that the target is to the right of the equi-signal line, the voltage across the capacitor 139 will be greater during the periods when the switch 103 is in its upper position. During these periods, the switch 143 will be actuated to its lower position by the cam 145, connecting the capacitor 141 directly across the resistor 139. The capacitor 141 is thus charged to a voltage equal to that corresponding to the strength of the signal reflected by the target when the antenna 107 is radiating. When the switch 103 is in its lower position, the voltage across the resistor 139 corresponds similarly to the strength of the signal reflected from the target when the antenna 105 is radiating. At this time, the switch 143 is in its upper position, connecting the resistor 139 and the capacitor 141 in series, but in opposite polarity, to the input circuit of the filter 147. The average voltage applied to the filter 147 is thus proportional to the difference in the strengths of the signals reflected by the target in response to signals radiated by the antennas 105 and 107, respectively.

The filter 147 smooths out the cyclical variations in its input, providing a substantially steady D.-C. output of a magnitude corresponding to said average input magnitude. This output is applied to the relay 151 through the amplifier 149, as described above, to control the energization of the motor 37. When the target is off to the right of the equi-signal line, the motor 37 is energized to rotate the shaft 29 clockwise, moving the equi-signal line toward the line of sight of the target. Conversely, if the target is to the left, the motor 37 rotates the shaft 29 counter-clockwise. Thus the equi-signal line of the antennas 105 and 107 is maintained substantially continuously coincident with the line of sight of the target.

The steering of the seeker craft in response to target azimuth is effected by means of a servomotor system including a Wheatstone bridge circuit having variable resistance elements 165 and 167, a polarized relay 169 and a reversible motor 171. The system performs the functions of the shaft 55 and the differential 53 of Figure 3. The resistance elements 165 and 167 are adjustable voltage dividers mechanically coupled to the antenna shaft 29 and the shaft 173 of the motor 171, respectively. A battery 175 is connected across the resistor 167 for energizing the bridge circuit. A battery 177 is connected to the motor 171 through the contacts of the polarized relay 169. Unbalance of the bridge circuit causes the armature of the relay 169 to deflect in one direction or the other depending upon the direction of unbalance, thus energizing the motor 171 to rotate the movable contact of the voltage divider 167, rebalancing the bridge. The shaft 173 of the motor 171 is also connected to the steering mechanism of the seeker craft.

A pair of fixed resistors 179 and 181 are connected to respective terminals of the voltage divider 165 and to the lower fixed contacts of a double-pole double-throw switch 183. A pair of variable resistors 185 and 187 are similarly connected between respective terminals of the voltage divider 165 and corresponding upper fixed contacts of the switch 183. The resistors 185 and 187 are provided with a common shaft 189. When the switch 183 is in its lower position, the fixed resistors 181 and 179 are included in the bridge circuit, and the shaft 173 of the motor 171 will be maintained substantially continuously in an angular position corresponding to that of the antenna shaft 29. The seeker craft will be controlled thereby to head directly toward the target at all times, and hence, will follow a homing course.

When the switch 183 is in its upper position, the resistors 185 and 187 are included in the bridge circuit. As long as the movable contacts of these resistors remain in their center positions, the action will be the same as it is when the switch 183 is in the lower position. However, if the shaft 189 is rotated from the center position, for example clockwise, less of the resistor 185 and more of the resistor 187 will be included in the respective bridge arms, biasing the balance point so that the shaft 173 no longer occupies a position corresponding to that of the shaft 29, but moves to a position corresponding to the sum of the angular displacements of the shafts 29 and 189. Thus the seeker craft will be steered at an angle $\beta$ to the line of sight, where $\beta$ is proportional to the angular displacement of the shaft 189.

The shaft 189 is coupled to the output shaft of the variable ratio drive 47 through a clutch 191. Engagement of the clutch 191 causes the shaft 189 to rotate with rotation of the motor 37, thus biasing the bridge circuit by means of resistors 185 and 187 in proportion to change in the target sight angle.

The rate of sight angle correction, and the rate at which the steering is biased with respect to the line of sight, are controlled as described with reference to Figure 3, by the range responsive servomotor system 31. The servomotor system 31 comprises a limiter 193, a counter 195 and a D.-C. amplifier 197 connected in cascade to the output of the receiver 131. The amplifier 197 is connected to a relay 199, identical with the relay 151 in the comparator 35. A reversible motor 201 is connected to the relay 199 and to a battery 203 in the same manner as the motor 37 is connected to the relay 151 and the battery 153. The connection between the counter 195 and the amplifier 197 includes a variable bias source comprising a battery 205 and an adjustable voltage divider 207. The shaft of the voltage divider 207 is coupled to the motor 201. The bias provided by this arrangement opposes the output of the counter 195.

In operation, the beat output of the receiver 131 is limited to a constant amplitude by the limiter 193 and applied to the counter 195. The output of the counter 195 is a unidirectional voltage having a magnitude proportional to the frequency of the receiver output, and hence, proportional to the target range. As long as the voltage divider 207 is adjusted to provide a bias equal to the counter output voltage, the motor 201 is deenergized. Upon the occurrence of a change in the magnitude of the counter output, the D.-C. amplifier actuates the relay 199, causing the motor 201 to rotate the voltage divider 207, altering the bias to again match the counter output. Thus, the shaft of the motor 201 is maintained substantially continuously in an angular position corresponding to the target range. The mechanical connections between the motor 201 and the variable ratio drive mechanisms 45 and 47 are such that the drive ratio of the device 45 is varied in proportion to the reciprocal to the target range, while that of the device 47 is varied in direct proportion to the target range.

Although the devices 45 and 47 may be controlled as simple functions of the target range, it may be preferable to operate as a function of the distance divided by the rate of change of distance, or time from target. A system for providing mechanical output as a function of said time from target is illustrated in Figure 5. The system of Figure 5 may be substituted bodily for the system 31 of Figure 4 to provide control in response to time from target. Referring to Figure 5, a limiter 193 is connected through a double-throw switch 213 to a positive counter 215 and a negative counter 217. The switch 213 is arranged to be actuated in synchronism with the transmitter switch 103 by means of a cam 325, so that the output of the limiter 213 is applied to the positive counter 215 during increase in frequency of the transmitted signal and to the negative counter 217 during decrease of frequency of the transmitted signal.

The counters 215 and 217 are provided with a common load resistor 219 which is connected to the input circuit of a D.-C. amplifier 221. The output circuits of the counters 215 and 217 are returned to points in the circuit of the amplifier 221 so as to provide linearity of counter operation. The output circuit of the amplifier 221 is connected to a relay 199. The contacts of the relay 199 are connected to a battery 203 and a reversible motor 201. The connections and the operation of the relay 199 and motor 201 are identical to the correspondingly numbered parts shown in Figure 4. The shaft of the motor 201 is coupled to the voltage divider 129 of the radar system 25 to control the band width of the frequency modulation thereof.

In the operation of the system, the average frequency of the beat output of the receiver 131 is proportional to the distance of the target and to the band width swept by the transmitter. When the seeker is moving toward the target, Doppler effect causes the reflected signal received at the antenna 135 to be higher in frequency than the corresponding transmitted signal by an amount proportional to the speed. This causes the beat frequency to be less than the average value during increase of transmitted frequency and greater than the average value during decrease of transmitted frequency. Thus the frequency of the beat note varies cyclically between two limits which differ by an amount proportional to the speed.

The counters 215 and 217 are connected to the resistor 219 so that their outputs oppose each other. If the two counters were of equal sensitivities, the average current in the resistor 219 would be directly proportional to the speed, since the only difference in their outputs would be due to the operation of the counter 215 upon the increase of transmitted frequency and the operation of the counter 217 upon decrease of transmitted frequency. However, the counter 215 is designed to be more sensitive than the counter 217 by a predetermined factor, so that the average current through the resistor 219 is proportional to $$ad-v$$

where $d$ is the distance of the target, $v$ is the velocity of the seeker with respect to the target and $a$ is proportional to the band width through which the transmitter frequency is varied.

The factor $a$ depends in turn upon the adjustment of the voltage divider 129. The voltage developed across the resistor 219 is amplied by the amplifier 221 to control the relay 199, energizing the motor 201 so as to drive the voltage divider 129 to a position such that the voltage across the resistor 219 becomes zero. Thus, the system automatically maintains conditions such that $$ad-v=0$$

Since $$\frac{d}{v}$$

is equal to the time T which will be required under current conditions for the seeker to arrive at the target, $$a=\frac{1}{T}.$$

The transmission through the voltage divider 129 is proportional to $a$, and is a function of the angular position of the shaft of the motor 201. Thus, the shaft of the motor 201 is maintained substantially continuously in an angular position which is a predetermined function of the time from target T. It will be apparent that if the resistance-displacement characteristic of the voltage divider 129 is linear, the position of the motor 201 is directly related to the reciprocal of the time from target. If the characteristic is tapered to provide a reciprocal resistance-displacement characteristic, the position of the motor 201 will be directly proportional to the time T. In either event the connections of the motor 201 to the variable drive mechanisms is such as to provide sight angle correction at a rate which is proportional to $$\frac{1}{T}$$

and bias of the steering system in direct proportion to the time from target.

Thus the invention has been described as an improved system for automatically directing a mobile craft toward a selected target. The rate at which correction of course is made in response to a deviation from the desired course is automatically regulated as an inverse function of the target range. Throughout the specification and the appended claims, the term "function of target range" is intended to include the time from target, or range divided by rate of change of range.

I claim as my invention:

1. In a target azimuth responsive steering system for mobile craft, a target sighting device, a servomotor system connected to said sighting device to control automatically the course of said craft in accordance with the azimuth of a selected target, a device for determining target range, and means connected to said last-mentioned device to control automatically the speed of response of said servomotor system as a predetermined function of the range of said target.

2. A target azimuth responsive steering system for mobile craft, including a target sighting device, a servomotor system connected to said sighting device to control automatically the course of said craft in accordance with the azimuth of a selected target, said servomotor system including a variable ratio drive mechanism, a device for determining target range, and a second servomotor system connected to said last-mentioned device to control automatically the drive ratio of said mechanism as a predetermined function of the range of said target.

3. A target azimuth responsive steering system for mobile craft, including target sighting means, servomotor means responsive to said target sighting means to control automatically the course of said craft in accordance with the azimuth of a selected target, means for determining target range, and means responsive to said range determining means to control automatically the speed of response of said servomotor means as a predetermined linear algebraic function of the reciprocal of the range of said target.

4. A target azimuth responsive steering system for mobile craft, including target sighting means, servomotor means responsive to said target sighting means to control automatically the course of said craft, means for determining target range, and means responsive to said target range determining means to control the speed of response of said servomotor means.

5. An automatic steering system for mobile craft, including a directive radio target ranging system providing electrical output corresponding in a predetermined manner to the range of a selected target, and varying cyclically in a predetermined manner in accordance with the deviation of the position of said target from the directive axis of said radio system, a servomotor system connected to said radio system and responsive to the output thereof to maintain said directive axis substantially in coincidence with the line from said craft to said target, means coupling said servomotor system to the steering mechanism of said craft, and a second servomotor system connected to said radio system and responsive to the output thereof to control the speed of operation of said first servomotor system.

6. An automatic steering system for mobile craft, including a directive radio ranging system providing electrical output corresponding in a predetermined manner to the range of a selected target, and varying cyclically in a predetermined manner in accordance with the deviation of the position of said target from the directive axis of said system, a servomotor system connected to said radio system to provide mechanical output corresponding to the azimuth of said target with respect to a predetermined reference line, said servomotor system including means for varying the speed of operation thereof, means for applying said mechanical output to the steering mechanism of said craft, a second servomotor system connected to said radio system to provide mechanical output in accordance with a predetermined function of the range of said target, and means for applying the output of said second servomotor system to said means for varying the speed of operation of said first servomotor system.

7. In a radio target-responsive steering system for a mobile craft including a steering mechanism, including means providing automatically target range and target azimuth information and means for controlling the steering mechanism of said craft in response to said azimuth information, means for varying the speed of operation of said steering mechanism control means, and means responsive to said target range information to control said speed varying means.

8. In a radio target-responsive system for controlling the steering mechanism of a mobile craft, including means providing automatically target azimuth information and time from target information, and means for controlling said steering mechanism in response to said azimuth information, means for varying the speed of operation of said steering mechanism control means, and means responsive to said time from target information to control said speed varying means.

9. In a target azimuth responsive steering system for mobile craft, a target sighting device, a servo-motor system connected to said sighting device to control automatically the course of said craft in accordance with the azimuth of a selected target, a device for determining target range, and means connected to said last-mentioned device to control automatically the speed of response of said servomotor system in direct proportion to $$\frac{d'}{d}$$

where $d$ is the range of said target from said craft, and $d'$ is the time derivative of $d$.

ROYDEN C. SANDERS, JR.

REFERENCES CITED

The following references are of record in the file of this patent:

UNITED STATES PATENTS

| Number | Name | Date |
|--------|------|------|
| 2,176,469 | Moueix | Oct. 17, 1939 |